United States Patent Office 3,551,558
Patented Dec. 29, 1970

3,551,558
THERAPEUTICAL AEROSOL COMPOSITION AND PREPARATION THEREOF
Toshio Takebe, Saitama Prefecture, and Masanori Kayano and Noboru Naruse, Tokyo, Japan, assignors to Eisai Kabushiki Kaisha, Tokyo, Japan
No Drawing. Filed Aug. 18, 1967, Ser. No. 661,524
Int. Cl. A61k 27/00
U.S. Cl. 424—46           1 Claim

ABSTRACT OF THE DISCLOSURE

This invention provides a novel aerosol composition of a dispersion or suspension type to be used for therapeutical purposes; the composition consisting of a non-toxic liquefied propellant, a micropulverized solid medical substance in a varied concentration, a dispersing agent consisting of a phosphorous lipoid of natural source and an ester of orthophosphoric acid and a linear or branched higher alcohol containing 11 to 30 carbon atoms and presenting a liquid form at ordinary temperature.

The present invention further provides a process for the preparation of the above-mentioned aerosol composition by admixing the aforementioned constituents in accordance with a conventional manner employed for the preparation of the known similar aerosol compositions.

---

This invention relates to a novel aerosol composition and preparation thereof. In particular, this invention relates to a novel therapeutical aerosol composition containing a micropulverized solid, medical substance dispersed in a non-toxic, liquefied propellant which contains a particular dispersing agent hereinafter mentioned and a process for the preparation thereof.

Heretofore, many atomizable aerosol compositions for therepeutical purposes have been proposed, one of which is that prepared by dissolving a medical substance into a liquefied non-toxic propellant admixed with an excess amount of a co-solvent, such as, water, a volatile or difficultly volatile alcohol, acetone and the like, and another one of which is that prepared by dispersing a micropulverized solid medical substance into a non-toxic liquefied propellant containing a nonionic surfactant of an H.L.B. (hydrophilic-lypophilic balance) of less than about 10 and is soluble in said non-toxic liquefied propellant (see, for example, U.S. Pat. No. 3,014,844). Still another one is that prepared by dissolving a substance into a liquefied propellant admixed with less than 2% of water and a relatively large amount, such as, about 18–40%, of ethanol calculated on the total weight of the finished composition (see, for example, U.S. Pat. No. 2,868,691).

Since certain medical substances are unstable when contacted with water and since a certain liquefied propellant such as, Freon 11, has a tendency to decompose by water to liberate a corrosive hydrogen halide which affected the metallic pressure container in which the composition has been packed, as well as the releasing and metering devices made of metals, the liquefied propellant containing an excess amount of water as co-solvent, such as, the aforementioned first and third aerosol compositions is not unexceptionally utilizable for the preparation of all sorts of the therapeutical compositions.

The second type of the aforementioned aerosol compositions, on the other hand, has a shortcoming that the micropulverized particles of the solid substance present in a form of suspension shows a tendency of forming an irreversible agglomerate, a sedimentary precipitation or a floating flocculence upon a prolonged preservation that clogs the releasing and/or metering valves attached to the container when the packed composition is intermittently administered. It has been proved that the agglomerate, precipitate or flocculence when administered will adhere locally to the affected parts of patient resulting in an uneven distribution of the active substance.

The third of the abovementioned aerosol compositions usually contains at most 0.1–2.0% of the active compound, because the liquefied propellant owing to its small content of water shows only a limited dissolving power toward the most of medicines. The propellant is therefore useless when a preparation of the composition containing a medicine at a higher concentration is contemplated.

It has also been found that the propellant containing an excess amount of an organic co-solvent, such as, ethanol has the drawbacks, for instance, an undesirable irritation on the diseased region, a risk of firing, an inadequate depression of the autogenetic pressure of the propellant and a tendency of forming the undesirable large sizes of the mist sprayed out.

Now, broadly stated, the aerosol composition according to the present invention is prepared by dispersing a micropulverized solid medical substance into a non-toxic liquefied propellant capable of rapidly gasifying at a temperature below about 65° C. under atmospheric pressure in a presence of an effective amount of the particular dispersing agent without co-solvent. The dispersing agent herein used consists of a phosphorous lipoid substance of natural source and an ester of orthophosphoric acid and, in addition, a linear or branched higher alcohol containing 11 to 30 carbon atoms and presents in a form of liquid at ordinary temperature.

It has been found that the aerosol composition in a suspension type of the present invention by virtue of the presence of the said particular dispersing agent is characterized by its extraordinary high stability as compared with those of the known compositions.

All of the aforementioned drawbacks presented by the hitherto known aerosol compositions can thus be removed by providing the aerosol composition according to the present invention.

It has been found that the phosphorous lipoid compound or the ester of orthophosphoric acid contained in combination with the specified higher alcohol to be incorporated in the aerosol composition of the present invention serves as a protective colloid rendering the micropulverized solid particles of the medical substance immersible into the non-toxic liquid propellant and thus prevents the particles from agglomeration and in particular from a chemical attack caused by the moisture content which may be present in the composition; the latter behavior being observed far superior as compared with that presented by the known dispersing agent such as sorbitan trioleate. Any hygroscopic substances can therefore be used without difficulty for the preparation of the aerosol composition according to the present invention.

For the sake of understanding the superior stability of the aerosol composition of the present invention, a comparison test was conducted at the varied temperatures in connection with the following aerosol compositions containing respectively isoproterenol sulfate as an active agent in combination with the following dispersing agents:

(1) Soy lecithin (control);
(2) Higher fatty acid ester (control);
(3) Yolk lecithin plus trioleyl orthophosphate in accordance with the present invention.

| Dispersing agent | 0° C. | 25° C. | 45° C. |
| --- | --- | --- | --- |
| (1) | Medicine adhered on the wall of container. | Sign of forming small lumps of medicine was observed. | Small lumps of medicine irreversible was observed. |
| (2) | Slightly better than Agent (1) | Almost same as Agent (1) | Slightly better than Agent (1). |
| (3) | No adhesion of medicine on the wall of container was observed. | Good durability of dispersion was observed. | Good durability of dispersion was observed. |

From the above, it will be seen that the composition containing the dispersing agent (3) according to the present invention shows an excellent stability of the dispersion.

The specified liquid alcohol to be utilized in the aerosol composition of the present invention partly serves to promote the aforementioned beneficial effects achievable by the phosphorous compound and partly to secure the maintenance of the functions of the valve means without blockade of the package.

Illustrative medical substances to be incorporated into the composition of the present invention include organic compounds, such as, phenyl epherine hydrochloride, maleate and salicylate, tetracycline hydrochloride, fradiomycine sulfate and other antibiotics, various steroid compounds, N-acetyl cysteine and the like as well as inorganic compound used in a desiccating agent containing zinc oxide and the like.

The non-toxic liquefied propellants that may be used in the aerosol composition of the present invention include a wide variety of compounds used in the conventional aerosol compositions for therapeutical, sanitary and dressing purposes. Examples of such liquefied propellants are the lower alkan containing up to five carbon atoms, such as, butan and pentane; the chlorinated lower alkan commercially available under the trade names of "Freon," "Genetron" and Ucon." Illustratives of these compounds include dichlorotetrafluoroethane (Freon 114), trichloromonofluoromethane (Freon 11), dichloromonofluoromethane (Freon 21), monochlorodifluoromethane (Freon 22), trifluoroethane (Freon 113) and monochlorotrifluoromethane (Freon 13). These compounds may be used alone or in an admixture.

The phosphorous lipoid compounds of natural source include soy lecithin, yolk lecithin and the like, while, the phosphoric acid esters include orthophosphoric trioleyl ester, orthophosphoric tristearyl tetraglycol ester, orthophosphoric ester of high molecular polyoxyethylene alcohol and the like.

As for the specified higher alcohols that may be used for the preparation of the aerosol composition of the present invention, there is mentioned the alcohols of the linear or branched chain containing 11 to 30 carbon atoms and are liquid at ordinary temperature, such as, for example, 2-octyldodecanol alcohol, undecan-1-ol, cis-oleyl alcohol, 2-hexyloctanol, 2-hexyldecanol, 2-hexyldodecanol and the like. The alcohols are employed in an amount of about two-folds the amount of the phosphorous compound employed, but not critical.

In carrying out the process of the present invention, the subdivided solid medical substance insoluble in the liquefied propellant and possesses the particle sizes between about 10μ and about 350μ is dried and thoroughly wetted with a mixture of the aforementioned phosphorous lipoid or phosphoric acid ester and the specified higher alcohol to obtain a paste. The paste is then packed with the propellant in a pressure vessel in accordance with a conventional manner.

The following prescriptions are given by way of illustrative of the novel aerosol compositions according to the present invention, the compositions being useful for various inhalation chemotherapy of the disease, such as, asthma; as antihistamics, mulcolytics and the like:

EXAMPLE 1

|  | G. |
| --- | --- |
| Isoproterenol sulfate | 0.20 |
| 2-octyldodecanol | 0.10 |
| Yolk lecithin | 0.20 |
| Trioleyl orthophosphate | 0.10 |
| Dichlorodifluoromethane plus trichloro-monofluoromethane (50:50) sufficient to make up the total 100 ml. | |

EXAMPLE 2

|  | G. |
| --- | --- |
| Phenyl epherine tartrate | 0.20 |
| 2-octyl dodecanol | 0.10 |
| Yolk lecithin | 0.20 |
| Trioleyl orthophosphate | 0.10 |
| Dichlorodifluoromethane plus trichloromonofluoromethane (50:50) sufficient to make up the total 100 ml. | |

EXAMPLE 3

|  | G. |
| --- | --- |
| Isoproterenol sulfate | 0.20 |
| Phenyl epherine tartrate | 0.20 |
| 2-octyldodecanol | 0.20 |
| Yolk lecithin | 0.40 |
| Trioleyl orthophosphate | 0.20 |
| Dichlorodifluoromethane plus trichloromonofluoromethane (50:50) sufficient to make up the total 100 ml. | |

EXAMPLE 4

|  | G. |
| --- | --- |
| N-acetyl cysteine | 1.00 |
| 2-octyl dodecanol | 0.50 |
| Yolk lecithin | 1.00 |
| Trioleyl orthophosphate | 0.50 |
| Dichlorodifluoromethane plus trichloromonofluoromethane plus dichlorotetrafluoroethane (30:30:40) sufficient to make up the total 100 ml. | |

EXAMPLE 5

|  | G. |
| --- | --- |
| Maleic acid diphenylpyraline | 0.20 |
| 2-octyldodecanol | 0.10 |
| Yolk lecithin | 0.20 |
| Trioleyl orthophosphate | 0.10 |
| Dichloromonofluoromethane plus trichloromonofluoromethane (50:50) sufficient to make up the total 100 ml. | |

EXAMPLE 6

|  | G. |
| --- | --- |
| Tetracycline hydrochloride | 1.00 |
| 2-hexyldecanol | 0.50 |
| Yolk lecithin | 1.00 |
| Trioleyl orthophosphate | 0.50 |
| Dichlorodifluoromethane plus trichloromonofluoromethane (50:50) sufficient to make up the total 100 ml. | |

EXAMPLE 7

| | G. |
|---|---|
| Maleic acid diphenylypyraline | 0.20 |
| Tetracycline hydrochloride | 1.00 |
| 2-hexyldecanol | 0.50 |
| Yolk lecithin | 1.00 |
| Trioleyl orthophosphate | 0.50 |
| Dichlorodifluoromethane plus trichloromonofluoromethane (50:50) sufficient to make up the total 100 ml. | |

What is claimed is:

1. An aerosol composition useful for chemotherapy comprising a pressurized suspension of a micropulverized solid medical substance having a particle size between about 10µ and about 350µ dispersed in a non-toxic liquefied propellant having a boiling point lower than 65° C. under atmospheric pressure, the propellant containing a dispersing amount of dispersing agent consisting of a combination of about 1 part by weight of orthophosphoric trioleyl ester, about 1-2 parts by weight of an alcohol selected from the group consisting of 2-octyldodecanol and 2-hexyldecanol, and about 2 parts by weight of yolk lecithin.

References Cited

UNITED STATES PATENTS

| | | | |
|---|---|---|---|
| 2,868,691 | 1/1959 | Porush et al. | 424—45 |
| 3,014,844 | 12/1961 | Thiel et al. | 424—46 |
| 3,095,355 | 6/1963 | Abramson | 424—46 |
| 3,346,670 | 10/1967 | Papalos | 252—89 |

OTHER REFERENCES

Powers et al.: Scoville's The Art of Compounding, 7th ed. (1937), p. 107.

Sisley et al.: Encyclopedia of Surface Active Agents, pp. 78–79 (1952).

STANLEY J. FRIEDMAN, Primary Examiner